Patented June 1, 1954

2,680,129

UNITED STATES PATENT OFFICE 2,680,129

METHOD OF PRODUCING ORGANIC DIISOCYANATES

Hector Flores, Anniston, Ala., assignor to Monsanto Chemical Company, St. Louis, Mo., a corporation of Delaware No Drawing. Application January 2, 1952,
Serial No. 264,691

13 Claims. (Cl. 260—453)

This invention relates to a novel method of producing alkyl, cycloalkyl, alkaryl, aralkyl, aryl and hydroaryl diisocyanates.

Heretofore, alkyl, cycloalkyl, alkaryl aralkyl and hydroaryl diisocyanates have been prepared by reacting phosgene with the corresponding primary amines in the presence of relatively low boiling inert organic solvents to form an intermediate reaction product which is then treated with additional quantities of phosgene to form the corresponding diisocyanate. The crude product thus obtained is then treated with an inert gas such as nitrogen, methane, natural gas, etc. to remove unreacted phosgene and hydrogen chloride, whereupon the degassed product is distilled to separate the solvent from the diisocyanate.

As a modification of the above method, the above diisocyanates have been prepared by first forming the primary amine dihydrochloride salt, slurrying the salt in a relatively low boiling inert organic solvent and then treating the slurry with phosgene to convert it into a crude solution of the corresponding diisocyanate. This solution is then treated in the manner indicated in the preceding paragraph to degas same and separate the solvent from the diisocyanate product.

The above methods have enjoyed substantial commercial success, but they are subject to the disadvantage of producing excessive amounts of polymers and other undesirable by-products which substantially reduce the yield of the desired diisocyanate. Moreover, this reduction in yield of the diisocyanate is further enhanced by polymerization which occurs when the above solvents are distilled from the crude isocyanate solution. Furthermore, the above methods have the disadvantage of producing a hard residue containing entrapped diisocyanate, which is difficultly removable from the reactor. Finally, the above methods require excessively large amounts of phosgene in order to obtain optimum conversions.

It is an object of the instant invention to overcome the above disadvantages and to provide a new method which permits the production of the above organic diisocyanates in an easy and economical manner.

In accordance with the present invention, phosgene and a primary diamine are reacted together in the presence of an inert halogenated high boiling solvent to form an intermediate reaction product containing the corresponding amine hydrochloride, which is then treated with additional quantities of phosgene to convert same into a solution of the corresponding diisocyanate. As an alternative to the foregoing two-step method, there may be employed the single step method of directly producing the diisocyanate by reacting the corresponding primary amine dihydrochloride with phosgene in the presence of an inert high boiling halogenated organic solvent. In either case, the resulting crude solution of diisocyanate, with or without a degassing treatment to remove hydrogen chloride and unreacted phosgene, is subjected to fractional distillation to separate substantially pure diisocyanate as a distillate.

Broadly stated, the present invention comprises reacting phosgene with a primary amine or a hydrochloride of a primary diamine selected from the class consisting of alkyl, cycloalkyl, alkaryl, aralkyl, aryl and hydroaryl amines, the reaction being carried out in the presence of an inert halogenated high boiling organic solvent. The primary amine hydrochloride used in this reaction may be produced by reacting, in the presence of the above solvent, the corresponding amine with a compound selected from the class consisting of phosgene and hydrogen chloride.

More specifically, the instant invention comprises reacting a primary amine of the above type with phosgene in the presence of an inert chlorinated high boiling organic solvent to produce an intermediate reaction product containing the corresponding hydrochloride and then treating the foregoing reaction product with further quantities of phosgene to convert it into the corresponding diisocyanate.

Still more specifically, the instant invention comprises the foregoing methods of producing organic diisocyanates, which include the additional steps of degassing and/or fractionally distilling the resulting solution to recover the diisocyanate in a substantially pure form.

The instant invention is illustrated but not limited by the following specific examples. The parts are by weight.

EXAMPLE I

Meta-tolylene diisocyanate

A phosgene solution was produced by bubbling phosgene at the rate of 700 c. c. per min. into 188 parts of cooled stirred ortho-dichlorobenzene for a period of about 26 minutes, and to this product a solution of 50 parts of meta-tolylene diamine in 188 parts of the above chlorinated solvent was introduced. The introduction of the meta-tolylene diamine solution was executed in a period of about 15 minutes, and during this time the ensuing reaction took place at a temperature below about 40° C. to produce a slurry of an intermediate reaction product.

As soon as the foregoing reaction had been completed, the slurry of intermediate reaction product was heated to about 150° C. to about 165° C. and treated with phosgene for 220 minutes to convert the above slurry into a crude solution of the corresponding diisocyanate, the phosgene being supplied to the slurry at an average rate of about 80 c. c. per minute.

The crude solution of meta-tolylene diisocyanate obtained in the above described manner was heated to a temperature of about 165° to about 170° C. and treated for 30 minutes with dry natural gas to remove hydrogen chloride and unreacted phosgene. Then, the degassed product was fractionally distilled at about 76° C. to about 111° C. and a pressure of about 3.5 to about 4 mm. of Hg to separate meta-tolylene diisocyanate in a yield corresponding to 62% of theory, basis meta-tolylene diamine.

EXAMPLE II 210 parts of phosgene was dissolved in 1002 parts of chlorinated biphenyl containing 42% Cl, and to this product a solution of 195 parts of meta-tolylene diamine in 780 parts of the above chlorinated solvent was added with stirring. The above addition was carried out in a period of about 22 minutes and the resulting reaction took place at a temperature in the range of about 10° C. to about 58° C. to form a slurry of an intermediate reaction product.

Upon completing the above reaction, the slurry was heated to a temperature of from about 105° C. to about 198° C. and treated with gaseous phosgene until a total of about 3.2 moles of this reactant had been introduced and the slurry converted into a crude solution of meta-tolylene diisocyanate.

The crude solution of meta-tolylene diisocyanate thus obtained was treated for 1 hour at a temperature of from 110° C. to 198° C. with dry natural gas to eliminate hydrogen chloride and unreacted phosgene. The degassed product was thereupon distilled at a temperature of about 104° C. to about 131° C. and a pressure of about 4.5 mm. of mercury to separate meta-tolylene diisocyanate from the above chlorinated solvent. The meta-tolylene diisocyanate was recovered in a yield corresponding to 82.2% of theory, basis meta-tolylene diamine.

EXAMPLE III 50 parts of meta-tolylene diamine was dissolved in 375 parts of ortho-dichlorobenzene and then converted into the corresponding dihydrochloride by treatment with anhydrous hydrogen chloride. The resulting slurry was further diluted with 375 parts of ortho-dichlorobenzene, then heated to a temperature of about 170° C. to about 180° C. and reacted with phosgene to form a crude solution of meta-tolylene diisocyanate.

The crude product obtained in the above described manner was heated to a temperature of about 165° C. to about 175° C. and then treated with natural gas to remove hydrogen chloride and unreacted phosgene. The degassed product was then distilled at a temperature of about 40° C. to about 90° C. while under a pressure of about 3.5 mm. of mercury to remove the ortho-dichlorobenzene, whereupon the residue was distilled at a temperature of about 92° C. to about 112° C. at 3.5 mm. pressure to separate meta-tolylene diisocyanate in a yield corresponding to 62% of theory, basis meta-tolylene diamine.

EXAMPLE IV 195 parts of meta-tolylene diamine was dissolved in 1767 parts of chlorinated biphenyl (42% Cl) and treated with dry hydrogen chloride to produce a slurry of meta-tolylene diamine dihydrochloride. This slurry was heated to a temperature in the range of 122° C. to 212° C. and treated with phosgene for 58 minutes until a total of 3.12 moles of this reactant has been introduced.

The crude solution of meta-tolylene diisocyanate thus produced was treated with dry natural gas for about 45 minutes to remove hydrogen chloride and unreacted phosgene, this operation being executed at a temperature within the range of 115° C. to 190° C. The degassed product was then fractionally distilled at a temperature of 109° C. to 135° C. and at a pressure of about 5 mm. of mercury and substantially pure meta-tolylene diisocyanate was thereby recovered as distillate in a yield corresponding to 81.4% of theory.

The foregoing examples demonstrate in a striking manner the fact that the use of a high boiling solvent in accordance with the instant invention results in the production of substantially increased yields of relatively pure diisocyanates over that obtainable with a low boiling solvent.

The experimental data hereinafter presented show that the use of a high boiling solvent directly affects the degree of conversion and also that the increased yield of the final product is not merely attributable to the isocyanate recovery step. These data represent the yields of meta-tolylene diisocyanate which were obtained and determined prior to the distillation step.

| Run No. | Method Employed | Solvents | Yields Prior to Distillation, Percent of Theory, Basis Meta-tolylene Diamine |
|---|---|---|---|
| 1* | Two Step Method | Ortho-dichlorobenzene | 70 |
| 2* | do | Chlorinated Biphenyl Containing 42% by Weight of Chlorine | 85 |

*The above runs were carried out by reacting phosgene and meta-tolylene diamine in the presence of the above solvents to form an intermediate reaction product which was then reacted with additional quantities of phosgene to produce a solution containing meta-tolylene diisocyanate in the above yields, the last mentioned reaction taking place at a temperature of about 165° C.

The above experimental data clearly demonstrate that markedly improved yields of crude organic diisocyanates are obtained by the high boiling solvent method of the instant invention. This is important because the crude material can frequently be used directly as an intermediate in the production of other products and also because it contributes to an increase in the final yield of the substantially pure diisocyanate.

The experimental data hereinbefore submitted clearly show that the high boiling solvent method produces surprising results since the use of higher temperatures in the reaction and distillation steps would normally be expected to enhance the degree of polymerization of the isocyanates and thereby decrease the yield of diisocyanate.

The method of the instant invention is applicable to the production of alkyl, cycloalkyl, alkaryl, aralkyl, aryl and hydroaryl diisocyanates. Illustrative examples of these are octamethylene diisocyanate, undecamethylene diisocyanate, dodecamethylene diisocyanate, 3,3' diisocyanate dipropyl ether, etc.; cyclopentylene-1,3 diisocyanate, cyclohexylene-1,4 diisocyanate, etc.; xylylene 1,4 diisocyanate, xylylene 1,3-diisocyanate, 4,4'-diphenylmethane diisocyanate, etc., $\alpha,\alpha'$-xylene diisocyanate-1,3; $\alpha,\alpha'$-xylene diisocyanate-1,4; o-, m- and p-tolylene diisocyanate, 1-methyl phenylene-2,4-diisocyanate, naphthalene 1,4-diisocyanate, etc.; and 1,2,3,4-tetrahydronaphthalene -5,8-diisocyanate, 1,2,3,4-tetrahydro-6-chloronaphthalene-5,8-diisocyanate.

In the production of organic diisocyanates in accordance with the instant invention, phosgene and a primary diamine are reacted together in the presence of an inert high boiling chlorinated organic solvent to form an intermediate reaction product containing the corresponding hydrochloride. This reaction is effected at a temperature substantially in the range of about —20° C. to about 60° C. and within these limits a temperature of about 30° C. to about 50° C. is preferred.

The intermediate reaction product obtained in the foregoing manner is then reacted with phosgene in the presence of the above solvent to convert it into the corresponding diisocyanate. This reaction is effected at a temperature substantially in the range of about 80° C. to about 250° C. and within this range a temperature of about 130° C. to about 200° C. is preferred.

In executing the above reactions, the reactants are reacted together in the proportions calculated to provide an overall phosgene/amine molecular ratio of about 2.2 or higher. This means that if in the primary reaction a molar ratio of less than 1 is used, sufficient phosgene is added in the secondary reaction step to bring the final phosgene/amine molar ratio up to the above value. Larger or smaller overall phosgene/amine molar ratios are also within the scope of the invention, but when smaller ratios are employed, the theoretical requirements at least should be substantially met.

The reaction between phosgene and the slurry or solution of primary amine hydrochloride in an inert organic solvent is executed at a temperature substantially in the range of about 80° C. to about 250° C. or more specifically in the range of about 120° C. to about 250° C. and within these limits a temperature of about 150° C. to about 200° C. is preferred.

The above reactants are employed in a phosgene/amine hydrochloride molar ratio of about 2.2. Larger or smaller molar ratios are also within the scope of the invention, but when using smaller ratios the theoretical requirements at least should be substantially met.

It is desired to point out that in each of the modifications of applicant's invention hereinbefore described, the degassing step is optional and may be omitted if desired.

The high boiling inert halogenated organic solvents within the scope of the instant invention are those inert halogenated organic solvents which boil at a temperature of about 275° C. to about 400° C. at atmospheric pressure. Illustrative examples of these are chlorinated polynuclear hydrocarbons such as chlorinated biphenyls containing from 21% to 62% chlorine, 1,2-dichloronaphthalene, 1,3-dichloronaphthalene, 1,4 dichloronaphthalene, 4,4'-dichlorodiphenylether, 3-methyl-4,4'-dichlorobiphenyl, etc.

In contrast to the above high boiling solvents, the low boiling solvents of the prior art have boiling points which do not exceed 255° C. at atmospheric pressure. Typical examples of these are benzene, chlorobenzene, dichlorobenzene, toluene, xylene, nitrobenzene, cyclohexane, kerosene, carbon tetrachloride, tetrachloroethylene, trichloroethylene, tetrachloroethane, trichlorobenzene, decahydronaphthalene, tetrahydronaphthalene, amylbenzene, p-cymene, o-cymene, m-cymene, n-dodecylbenzene, naphthalene, n-heptylcyclopentane and biphenyl.

The above description and examples are intended to be illustrative only. Any modification or variation therefrom which conforms to the spirit of the invention is intended to be included within the scope of the claims.

What I claim is:

1. The method of producing organic diisocyanates, which comprises reacting phosgene with the hydrochlorides of primary diamines selected from the class consisting of alkyl, cycloalkyl, alkaryl, aralkyl, aryl and hydroaryl amines, said reaction being carried out at a temperature in the range of about 80° C. to about 250° C. and in the presence of an inert chlorinated organic solvent which boils at a temperature of from about 275° C. to about 400° C.

2. The method of producing organic diisocyanates in accordance with claim 1, wherein the primary amine hydrochlorides are produced by reacting the corresponding amines with a compound selected from the group consisting of phosgene and hydrogen chloride.

3. The method of producing organic diisocyanates in accordance with claim 2, wherein a chlorinated polynuclear hydrocarbon is used as the inert chlorinated organic solvent.

4. The method of producing organic diisocyanates in accordance with claim 2, wherein chlorinated biphenyl containing from 21% to 62% by weight of chlorine is used as the inert chlorinated organic solvent.

5. The method of producing organic diisocyanates in accordance with claim 2, wherein chlorinated biphenyl containing 42% chlorine is used as the inert chlorinated organic solvent.

6. The method of producing organic diisocyanates in accordance with claim 2, wherein a chlorinated naphthalene is used as the inert chlorinated organic solvent.

7. The method of producing meta-tolylene diisocyanate which comprises reacting phosgene with meta-tolylene diamine dihydrochloride in the presence of an inert chlorinated organic solvent which boils at a temperature of from about 275° C. to about 400° C., said reaction being carried out at a temperature in the range of about 80° C. to about 250° C.

8. The method of producing meta-tolylene diisocyanate in accordance with claim 7, wherein the meta-tolylene diamine dihydrochloride is prepared by reacting the corresponding amine with a compound selected from the group consisting of phosgene and hydrogen chloride.

9. The method of producing meta-tolylene diisocyanate in accordance with claim 8, wherein chlorinated biphenyl containing 21% to 62% chlorine is the inert chlorinated organic solvent used.

10. The method of producing meta-tolylene diisocyanate in accordance with claim 9, wherein chlorinated biphenyl containing 42% chlorine is the inert chlorinated organic solvent used.

11. The method of producing organic diisocyanates in accordance with claim 10, which includes the additional step of degassing the resulting solution of organic diisocyanate.

12. The method of producing organic diisocyanates in accordance with claim 11, which includes the additional step of recovering the diisocyanate from the resulting solution of said product.

13. The method of producing organic diisocyanates, which comprises reacting together, in the presence of an inert chlorinated organic solvent, phosgene and a primary diamine selected from the class consisting of alkyl, cycloalkyl, alkaryl, aralkyl, aryl and hydroaryl amines to form an intermediate reaction product containing the corresponding amine hydrochloride and then reacting said reaction product with phosgene at a temperature in the range of about 80° C. to about 250° C. to convert it into the corresponding diisocyanate, said inert chlorinated organic solvent having a boiling point of from about 275° C. to about 400° C., said reaction between said phosgene and said primary amine being carried out at a temperature in the range of about −20° C. to about 60° C.

References Cited in the file of this patent

UNITED STATES PATENTS

| Number | Name | Date |
|---|---|---|
| 2,326,501 | Siefken et al. | Aug. 10, 1943 |
| 2,374,340 | Farlow | Apr. 24, 1945 |